United States Patent
Shahar et al.

(10) Patent No.: US 10,148,581 B2
(45) Date of Patent: Dec. 4, 2018

(54) END-TO-END ENHANCED RELIABLE DATAGRAM TRANSPORT

(71) Applicant: Mellanox Technologies Ltd., Yokneam (IL)

(72) Inventors: Ariel Shahar, Jerusalem (IL); Hillel Chapman, Ramat Hashofet (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 157 days.

(21) Appl. No.: 15/168,118

(22) Filed: May 30, 2016

(65) Prior Publication Data
US 2017/0346742 A1    Nov. 30, 2017

(51) Int. Cl.
H04L 12/801    (2013.01)
H04L 12/24     (2006.01)
H04L 5/00      (2006.01)

(52) U.S. Cl.
CPC ............ H04L 47/18 (2013.01); H04L 5/0055 (2013.01); H04L 41/22 (2013.01); H04L 47/11 (2013.01)

(58) Field of Classification Search
CPC ....... H04L 47/18; H04L 5/0055; H04L 47/11; H04L 41/22
See application file for complete search history.

(56) References Cited

U.S. PATENT DOCUMENTS 6,321,276 B1     11/2001    Forin
6,496,481 B1 *   12/2002    Wu .................... H04L 1/1628
                                                           370/242
6,766,467 B1      7/2004    Neal et al.
6,789,143 B2      9/2004    Craddock et al.
6,981,027 B1     12/2005    Gallo et al.
7,171,484 B1      1/2007    Krause et al.
7,263,103 B2      8/2007    Kagan et al.
7,299,266 B2     11/2007    Boyd et al.
7,464,198 B2     12/2008    Martinez et al.
7,475,398 B2      1/2009    Nunoe
(Continued)

OTHER PUBLICATIONS

Infiniband Trade Association, "InfiniBandTM Architecture Specification", vol. 1, Release 1.3, 1842 pages, Mar. 3, 2015.
(Continued)

*Primary Examiner* — Yemane Mesfin
*Assistant Examiner* — Henry Baron
(74) *Attorney, Agent, or Firm* — D.Kligler IP Services Ltd.

(57) ABSTRACT

A method for communication includes establishing, using an end-to-end reliable transport context, a channel for exchange of data packets over a network between a first network interface controller (NIC) of a first computing node on the network and a second NIC of a second computing node on the network. The first NIC accepts first and second work items for execution on behalf of different, first and second sender processes, respectively, that are running on the first computing node. The first and second work items are executed by transmitting over the network from the first NIC to the second NIC, using the end-to-end reliable transport context, first and second messages directed to different, first and second receiver process running on the second computing node, using the same end-to-end reliable transport context. The second message is sent before receiving from the second NIC any acknowledgment of the first message.

18 Claims, 3 Drawing Sheets

(56) References Cited

U.S. PATENT DOCUMENTS

| | | |
|---|---|---|
| 7,548,999 B2 | 6/2009 | Haertel et al. |
| 7,688,838 B1 | 3/2010 | Aloni et al. |
| 7,748,002 B1 | 6/2010 | Burcak |
| 7,835,380 B1 | 11/2010 | Aloni et al. |
| 8,001,592 B2 | 8/2011 | Hatakeyama |
| 8,010,763 B2 | 8/2011 | Armstrong et al. |
| 8,051,212 B2 | 11/2011 | Kagan et al. |
| 8,213,315 B2 * | 7/2012 | Crupnicoff ............... H04L 67/14 370/236 |
| 8,255,475 B2 | 8/2012 | Kagan et al. |
| 8,447,904 B2 | 5/2013 | Riddoch |
| 8,645,663 B2 | 2/2014 | Kagan et al. |
| 8,751,701 B2 | 6/2014 | Shachar et al. |
| 8,761,189 B2 | 6/2014 | Shachar et al. |
| 9,031,086 B2 | 5/2015 | Shachar et al. |
| 9,143,467 B2 | 9/2015 | Kagan et al. |
| 9,256,545 B2 | 2/2016 | Raindel et al. |
| 9,838,321 B2 * | 12/2017 | Contavalli ............. H04L 47/193 |
| 2002/0152327 A1 | 10/2002 | Kagan et al. |
| 2003/0046530 A1 | 3/2003 | Poznanovic |
| 2003/0145094 A1 | 7/2003 | Staamann et al. |
| 2004/0221128 A1 | 11/2004 | Beecroft et al. |
| 2004/0230979 A1 | 11/2004 | Beecroft et al. |
| 2006/0007926 A1 | 1/2006 | Zur et al. |
| 2007/0005896 A1 | 1/2007 | Chang et al. |
| 2007/0011429 A1 | 1/2007 | Sangili et al. |
| 2007/0061492 A1 | 3/2007 | Van Riel |
| 2007/0294426 A1 | 12/2007 | Huang et al. |
| 2007/0299970 A1 | 12/2007 | Huang et al. |
| 2008/0002578 A1 | 1/2008 | Coffman et al. |
| 2009/0034551 A1 | 2/2009 | Elzur |
| 2010/0095085 A1 | 4/2010 | Hummel et al. |
| 2011/0023027 A1 | 1/2011 | Kegel et al. |
| 2011/0179226 A1 * | 7/2011 | Takata ................. G06F 12/0831 711/125 |
| 2014/0369447 A1 * | 12/2014 | Ries ........................ H04L 7/042 375/340 |
| 2015/0103659 A1 * | 4/2015 | Iles ......................... H04L 47/11 370/235 |

OTHER PUBLICATIONS

"MPI: A Message-Passing Interface Standard", Version 2.2, Message Passing Interface Forum, 647 pages, Sep. 4, 2009.

Shah et al., "Direct Data Placement over Reliable Transports", IETF Network Working Group, RFC 5041, 38 pages, Oct. 2007.

Culley et al., "Marker PDU Aligned Framing for TCP Specification", IETF Network Working Group, RFC 5044, 74 pages, Oct. 2007.

"Mellanox ConnectX IB: Dual-Port Infinitude Adapter Cards with PCI Express 2.0", Mellanox Technologies, 2 pages, USA, 2008.

"Supplement to InfiniBandTM Architecture Specification vol. 1.2.1, Annex A14: Extended Reliable Connected (XRC) Transport Service", 43 pages, Revision 1.0, 2009.

"Linux kernel enable the IOMMU—input/output memory management unit support", 2 pages, Oct. 15, 2007 http://www.cyberciti.biz/tips/howto-turn-on-linux-software-iommu-support.html.

* cited by examiner

END-TO-END ENHANCED RELIABLE DATAGRAM TRANSPORT

FIELD OF THE INVENTION

The present invention relates generally to packet communication networks, and specifically to inter-process communication over such networks.

BACKGROUND

InfiniBand™ (IB) is a scalable, switch-based, point-to-point interconnect architecture which defines both a layered hardware protocol (physical, link, network, transport layers) and a software layer, which manages initialization and communication between devices. The IB protocols and other network features are defined in the *InfiniBand Architecture Specification* (Release 1.3, March, 2015, referred to hereinafter as the "IB specification"). The IB specification is incorporated herein by reference for purposes of the transport layer protocols and packet formats that it describes, but to the extent that any terms are defined in the IB specification in a manner that conflicts with definitions made explicitly or implicitly in the present patent application, only the definitions in the present patent application should be considered.

The IB transport layer is responsible for in-order packet delivery (including reliable packet delivery, as defined below), partitioning, channel multiplexing and transport services. Client processes, running on a host computer, interact with the transport layer on the host channel adapter (HCA, also referred to generically as a network interface controller, or NIC) of the computer by submitting work requests (WRs). Host driver software translates the WRs into work items, referred to as work queue elements (WQEs), and queues them in assigned queue pairs (QPs) for execution by the HCA. Each QP conventionally includes a send queue (SQ) and a receive queue (RQ).

The transport layer also handles transaction data segmentation when sending and reassembly when receiving. Based on the Maximum Transfer Unit (MTU) of the path, the transport layer divides the data into packets of the proper size. A receiver reassembles the packets based on their Base Transport Header (BTH), which normally contains the destination QP number and packet sequence number (PSN). The receiver acknowledges the packets, and the sender receives these acknowledgements and updates a completion queue with the status of the operation.

IB specifies the following transport services:

Reliable Connection (RC). RC provides a reliable transfer of data between two entities. RC transport provides remote direct memory access (RDMA) operations, atomic operations, and reliable channel semantics. As a connection-oriented transport, RC requires a dedicated queue pair (QP) for each pair of requester and responder processes.

Unreliable Connection (UC). UC facilitates an unreliable transfer of data between two entities. Unlike RC, UC messages may be lost. UC provides RDMA capability, but does not guarantee ordering or reliability. Each pair of connected processes requires a dedicated QP.

Reliable Datagram (RD). Using RD enables one or more QPs to send and receive messages using a reliable datagram channel (RDC) between each pair of reliable datagram domains (RDDs). RD provides most of the features of RC, but does not require a dedicated connection for each pair of processes.

Unreliable Datagram (UD). With UD, a QP can send and receive messages to one or more QPs, but the messages may get lost. UD is connectionless, allowing a single QP to communicate with any other peer QP. UD has a limited message size, and does not guarantee ordering or reliability.

Raw Datagram. A raw datagram is a data link layer service which provides a QP with the ability to send and receive raw datagram messages that are not interpreted.

Annex A14 of the IB specification defines an additional transport service: Extended Reliable Connected (XRC). XRC enables a single receive QP to be shared by multiple shared receive queues (SRQs) across one or more processes running on a given host. As a result, each process can maintain a single send QP to each host rather than to each remote process. A receive QP is established per remote send QP and can be shared among all the processes on the host.

U.S. Pat. No. 8,213,315, whose disclosure is incorporated herein by reference, describes a dynamically-connected (DC) transport service, which is intended to reduce the number of required QPs per end-node while preserving RC semantics. The DC transport service provides a datagram-like model that allows a DC QP to reach multiple remote processes in multiple remote nodes. Each WR submitted by a client process to a DC send queue includes information identifying the targeted remote destination process. DC contexts are then dynamically tied to each other across the network to create a dynamic (i.e., temporary) RC-equivalent connection that is used to reliably deliver one or more messages. When the initiator (i.e., the HCA of the sending end-node) reaches a point in its send queue at which either there are no further WQEs to execute, or the next WQE is destined to another process (possibly in a different node), the dynamic connection is torn down. The same DC context may then be used to establish a new dynamic connection to another destination process.

SUMMARY

Embodiments of the present invention that are described hereinbelow provide improved methods for inter-process communications over a packet data network, as well as apparatus and software implementing such methods.

There is therefore provided, in accordance with an embodiment of the invention, a method for communication, which includes establishing, using an end-to-end reliable transport context, a channel for exchange of data packets over a network between a first network interface controller (NIC) of a first computing node on the network and a second NIC of a second computing node on the network. The first NIC accepts first and second work items for execution on behalf of different, first and second sender processes, respectively, that are running on the first computing node. The first work item is executed by transmitting over the network from the first NIC to the second NIC, using the end-to-end reliable transport context, a first message including at least one first packet directed to a first receiver process running on the second computing node. The second work item is executed by transmitting over the network from the first NIC to the second NIC, using the same end-to-end reliable transport context and before receiving from the second NIC any acknowledgment of the first message, a second message including at least one second packet directed to a second receiver process running on the second computing node, different from the first receiver process.

In some embodiments, the method includes receiving at the first NIC from the second NIC an acknowledgment referring to the at least one second packet, and reporting, in response to the acknowledgment, from the first NIC to both the first and second sender processes that the first and second work items have been completed. In a disclosed embodiment, the method includes attaching, in the first NIC, at least first and second packet serial numbers, respectively, to the at least one first packet and the at least one second packet while maintaining a record in the first NIC of the packet serial numbers, wherein the acknowledgment refers only to the second packet serial number, and the first NIC refers to the record in reporting to the first sender process that the first work item has been completed.

Additionally or alternatively, accepting the first and second work items includes reading the first and second work items from first and second work queues, respectively, wherein the at least one first packet and the at least one second packet respectively reference the first and second work queues, as well as the end-to-end reliable transport context, and wherein the acknowledgment references the end-to-end reliable transport context but does not reference the first or the second work queue. Further alternatively or additionally, when the at least one second message includes a read request directed to the second receiver process, the acknowledgment includes a read response conveying data from a memory of the second computing node to the first computing node.

In some embodiments, the method includes maintaining a record in the first NIC of the transmitted messages, and when no acknowledgment is received from the second NIC to either of the first and second messages, retransmitting, responsively to the record, both the first and the second messages from the first NIC to the second NIC. In a disclosed embodiment, retransmitting both the first and the second messages includes retransmitting all of the packets that were transmitted by the first NIC using the end-to-end reliable transport context subsequently to a last packet that was transmitted by the first NIC and acknowledged by the second NIC using the same end-to-end reliable transport context.

Typically, establishing the channel includes establishing multiple channels using respective end-to-end reliable transport contexts between the first NIC and respective NICs of multiple other computing nodes on the network, wherein each of the end-to-end reliable transport contexts is configured to serve multiple sender and receiver processes running on the first computing node and the other computing nodes.

In one embodiment, transmitting the first message includes incorporating a source end-to-end context (EEC) identifier in the at least one first packet, wherein the method further includes returning a congestion notification from another node on the network to the first NIC referencing the EEC identifier.

In another embodiment, transmitting the first message includes incorporating a resynchronization sequence number in the at least one first packet, wherein the method further includes maintaining a record in the first NIC of the transmitted messages and the resynchronization sequence number, and when an error occurs in one or more of the messages transmitted to the second NIC, retransmitting, responsively to the record, the one or more of the messages from the first NIC to the second NIC while incrementing the resynchronization sequence number in the one or more retransmitted messages.

There is also provided, in accordance with an embodiment of the invention, communication apparatus, including a host interface, which is configured to communicate, with a host bus, with a central processing unit (CPU) of a first computing node running different, first and second sender processes. A network interface is configured to exchange data packets over a network with a peer network interface controller (NIC) of a second computing node. Processing circuitry, coupled between the host interface and the network interface, is configured to establish, using an end-to-end reliable transport context, a channel for communication over the network with the peer NIC, to receive, via the host interface, first and second work items for execution on behalf of the first and second sender processes, respectively, to transmit to the peer NIC through the network interface, in execution of the first work item, using the end-to-end reliable transport context, a first message including at least one first packet directed to a first receiver process running on the second computing node, and to transmit to the peer NIC through the network interface, in execution of the second work item, using the same end-to-end reliable transport context and before receiving from the peer NIC any acknowledgment of the first message, a second message including at least one second packet directed to a second receiver process running on the second computing node, different from the first receiver process.

The present invention will be more fully understood from the following detailed description of the embodiments thereof, taken together with the drawings in which:

DETAILED DESCRIPTION OF EMBODIMENTS

Overview

Figure 1:
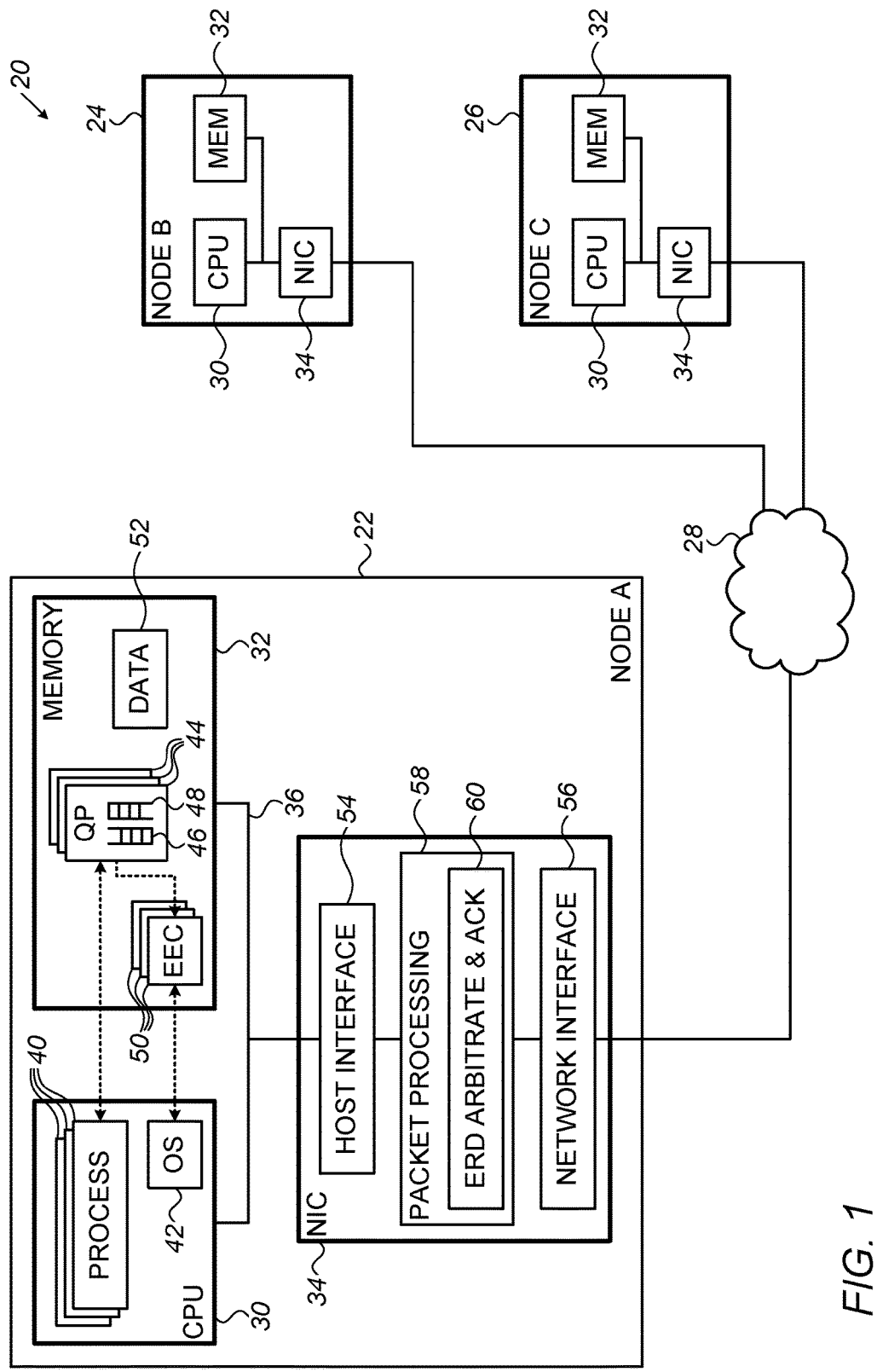
FIG. 1 is a block diagram that schematically illustrates a computer system implementing an enhanced reliable datagram service, in accordance with an embodiment of the invention.

As defined by the IB specification, the Reliable Datagram (RD) transport service provides an end-to-end channel between nodes in a computer network that can be used by any initiating process on one of the end nodes to communicate with any responding process on the other end node. RD therefore scales linearly with the number of participating nodes in the network, regardless of the number of processes per node.

In the specified RD packet format, the request packet transport header identifies both the sending QP, belonging to the sending process, and the receiving QP, belonging to the receiving process. These QP numbers are required in order to identify the receiving process on the destination end node, and in order for the receiving process to identify the process from which the message initiated. The RD acknowledgement (ACK) packet sent by the destination end node, as well as other types of response packets, such as RDMA read responses, also contain these same QP numbers identifying the sending QP and the receiving QP.

The end-to-end RD channel between a pair of end nodes can be used by multiple send-receive pairs of processes on the two end nodes. Since the ACK packet contains the QP numbers of the sending and receiving QPs, however, each ACK packet can refer only to a single outstanding message, between one of the many pairs of processes that may share the channel. For this reason, the IB specification allows the end-to-end RD channel to a carry only a single outstanding message, meaning that only a single sender-receiver pair of processes (or equivalently, requester and responder QPs) can use the RD channel at any given time. The HCA of the requesting end-node will transmit the next message on the RD channel only after receiving an acknowledgment or other response (or multiple responses in the case of a multi-packet response-message) to the message that is currently outstanding.

The limitation of the RD end-to-end channel to serve only one pair of processes at any given time leads to substantial latency and severely-limited bandwidth when multiple processes attempt to share the same channel. Consequently, although the RD transport service is, in principle, advantageous in its ability to scale with the number of nodes in a network, it has found little practical application.

Embodiments of the present invention that are described herein provide an enhanced reliable datagram (ERD) service, with the same scalability as RD, but much lower latency and higher bandwidth. Specifically, ERD provides a mechanism that enables the responding node to acknowledge multiple messages in a single response packet, even when the messages being acknowledged originate from different sender processes. (Each message comprises one or more packets.) In other words, the HCA of the responding end-node can coalesce acknowledgments to multiple sender processes in the same response packet. The HCA of the requesting end-node keeps track of the packets that it has transmitted and is thus able to handle these coalesced responses, as well as retransmitting the appropriate packets when an acknowledgment does not arrive in time. These features of the ERD service enable the HCA of the requesting end-node to pipeline requests, i.e., to transmit messages from multiple different sending processes in immediate succession, without waiting for an acknowledgment between one message and the next.

The description that follows and the claims refer to end-to-end reliable packet transport over a network between a pair of computing nodes via their respective NICs. The computing nodes typically comprise host computers, but may alternatively comprise network nodes of other types with suitable computing and communication capabilities. In some of the specific examples that are described below, the network is an IB network, in which case the NICs may equivalently be referred to as HCAs, but the principles of the present invention are similarly applicable, mutatis mutandis, to transport over other types of networks, such as Ethernet and Fibre Channel networks, using other types of NICs. The term "reliable" is used in its conventional sense in the present description and in the claims, to refer to communication protocols in which packet delivery is assured on the basis of acknowledgment by the receiver.

Thus, in the disclosed embodiments, a first NIC on a first computing node uses an end-to-end reliable transport context to establish an ERD channel for exchange of data packets over a network with a second, peer NIC of a second computing node. The term "context" is used here in its conventional sense to mean the set of data that defines a transport channel between end-nodes (such as addresses, ports or queues, transport type, and quality of service) and is used by the end nodes in identifying the channel in packets that they transmit and receive to and from one another. For the sake of clarity and simplicity of description, the first NIC will be referred to as the requester, while the second NIC is referred to as the responder, although the second NIC may similarly be directed by the processes on the second computing node to act as the requester. Furthermore, although the examples described here refer to reliable communications between one pair of nodes, in typical scenarios the network includes many nodes, and the NIC of each node establishes multiple, respective end-to-end reliable transport contexts with the respective NICs of multiple other computing nodes. Each of these contexts can serve multiple sender and receiver processes running on the respective computing nodes.

Multiple work items are queued for execution by the requester NIC on behalf of different sender processes that are running on the first computing node, based on work requests submitted by these processes to transmit messages to receiver processes running on the second computing node. Upon accepting a first work item, on behalf of a first sender process, the requester NIC transmits over the network to the responder NIC, using the end-to-end reliable transport context, a first message comprising one or more packets directed to a first receiver process running on the second computing node. Then, before receiving any acknowledgment from the second NIC of the packet or packets in the first message, the requester NIC uses the same end-to-end reliable transport context to execute a second work item on behalf of a second sender process and accordingly to transmit an additional packet or packets in a second message. Typically, this second message is directed to a different, second receiver process running on the second computing node. Thus, in contrast to protocols that are known in the art, the requester NIC pipelines multiple messages, between different pairs of sending and receiving processes, over the same end-to-end reliable transport context without waiting for acknowledgments in between.

When the responder NIC sends an acknowledgment of a given packet that it has received over the end-to-end reliable transport context, it implicitly acknowledges receipt of all previously-transmitted packets. The acknowledgment may be in the form of a dedicated acknowledgment packet, or it may comprise a read response, which conveys data from the memory of the second computing node to the first computing node and is sent by the responder NIC in response to a read request message from the requester NIC. In either case, the acknowledgment references the end-to-end reliable transport context but does not reference the specific work queues of the sender processes from which the work items originated. Thus, in response to such an acknowledgment of a packet from the second message, the requester NIC is able to report to both the first and second sender processes that the first and second work items have been completed.

For the purposes of tracking and reporting message completion, the requester NIC attaches packet serial numbers to the packets that it transmits using the end-to-end reliable transport context and maintains a record of the transmitted packets and their respective serial numbers. Thus, when the acknowledgment refers to a certain packet serial number, the NIC is able to refer to its record in order to determine which work items have been completed. By the same token, when no acknowledgment is received from the responder NIC, the requester NIC refers to this same record in order to identify and retransmit all of the packets that were transmitted by the requester NIC using the end-to-end reliable transport context subsequently to the last packet that was acknowledged by the responder NIC. In this manner, the requester NIC can automatically retransmit packets from multiple messages, between multiple different pairs of sender/receiver processes.

System Description

FIG. 1 is a block diagram that schematically illustrates a computer system 20, in accordance with an embodiment of the invention. System 20 comprises multiple computing nodes 22, 24, 26, ... (labeled nodes A, B and C in the figure), which communicate with one another over a packet data network 28, such as an IB switch fabric. Each node 22, 24, 26 comprises a CPU 30 and a system memory 32, which are linked to a NIC 34, such as an IB HCA, by a host bus 36, such as a PCI Express® bus. For the sake of simplicity, only node 22 is shown in detail in FIG. 1, but nodes 24 and 26 are assumed to have a similar structure and functionality.

CPU 30 runs multiple processes 40, such as user-space application processes, as well as an operating system (OS) 42, comprising a kernel and driver programs for interacting with NIC 34 and other hardware components. To communicate with peer processes on other nodes 24, 26, ... , via network 28 using NIC 34, the NIC driver program assigns to each process 40 one or more queue pairs (QPs) 44, each comprising a send queue (SQ) 46 and a receive queue (RQ) 48. When a given process 40 submits a work request to transmit a message to a peer process on another node, the NIC driver queues a corresponding WQE in SQ 46 of the assigned QP 44 in memory 32. The WQE may reference data 52 in memory 32 for transmission to the peer process, for example in an RDMA write or send message. WQEs in RQ 48 point to buffers in memory 32 to which data received from the peer process should be written. NIC 34 reads and executes the send and receive WQEs from queues 46 and 48 in queue order.

For the purpose of enhanced reliable datagram service, the NIC driver program creates and writes an end-to-end context (EEC) 50 in memory 32 for each node 24, 26, ... , with which such a service is to be set up, and instructs NIC 34 to establish a corresponding end-to-end reliable transport channel based on the EEC with the peer NIC 34 of that node. EEC 50 is assigned to the kernel of OS 42, rather than to any particular client process 40, and can concurrently serve multiple QPs 44 (and their corresponding processes 40), assuming that the peer processes to which these QPs are directed are all located on the same node (for example, all on node 24 or all on node 26). Further details regarding EEC 50, as well as operation of the corresponding transport channel that uses EEC 50, are described hereinbelow with reference to the figures that follow.

NIC 34 comprises a host interface 54, which communicates via bus 36 with CPU 30 and memory 32 and enables the NIC to access QPs 44, EEC 50, and user data 52 by direct memory access (DMA). NIC 34 exchanges data packets over network 28 with peer NICs 34 of nodes 24, 26, ... , via a network interface 56. Packet processing circuitry is coupled between host interface 54 and network interface 56 and thus reads and executes WQEs from memory 32, and accordingly transmits and receives packets to and from peer NICs over network 28. Generally speaking, these functions of NIC 34 are well known in the art, as defined, for example, in the IB specification.

The remainder of this description will therefore focus on the novel enhanced reliable datagram (ERD) support implemented in processing circuitry 58, as embodied in an ERD arbitration and acknowledgment (ACK) block 60 shown in FIG. 1. As explained earlier, block 60 establishes, using EEC 50 in memory 32, end-to-end reliable transport channels for communication over network 28 with peer NICs 34 of other nodes 24, 26, .... Once such a channel has been established between node 22 and a given destination node, for example node 24, block 60 reads and arbitrates among WQEs in different QPs 44 that are linked to the corresponding EEC 50 (i.e., in the present example, QPs that are assigned to processes 40 on node 22 for communication with processes running on node 24). Execution of these WQEs causes processing circuitry 58 to transmit, using EEC 50, pipelined messages to the destination node, without waiting for acknowledgment of one message before transmitting the next. Block 60 keeps track of the messages that have been transmitted and of acknowledgments that are received from the destination node in order to report to processes 40 that their WQEs have been completed and, when necessary, to retransmit to the destination node packets belonging to messages that have not been acknowledged.

Although the elements of NIC 34 are shown in FIG. 4 as separate functional blocks for the sake of conceptual clarity, in practice these elements are typically implemented together as hardware logic circuits in an integrated circuit chip or a set of such chips. The hardware logic may be hard-wired or programmable. Alternatively or additionally, at least some of the functions of NIC 34 may be implemented in software or firmware running on a suitable programmable processor.

ERD Operation

Figure 2:
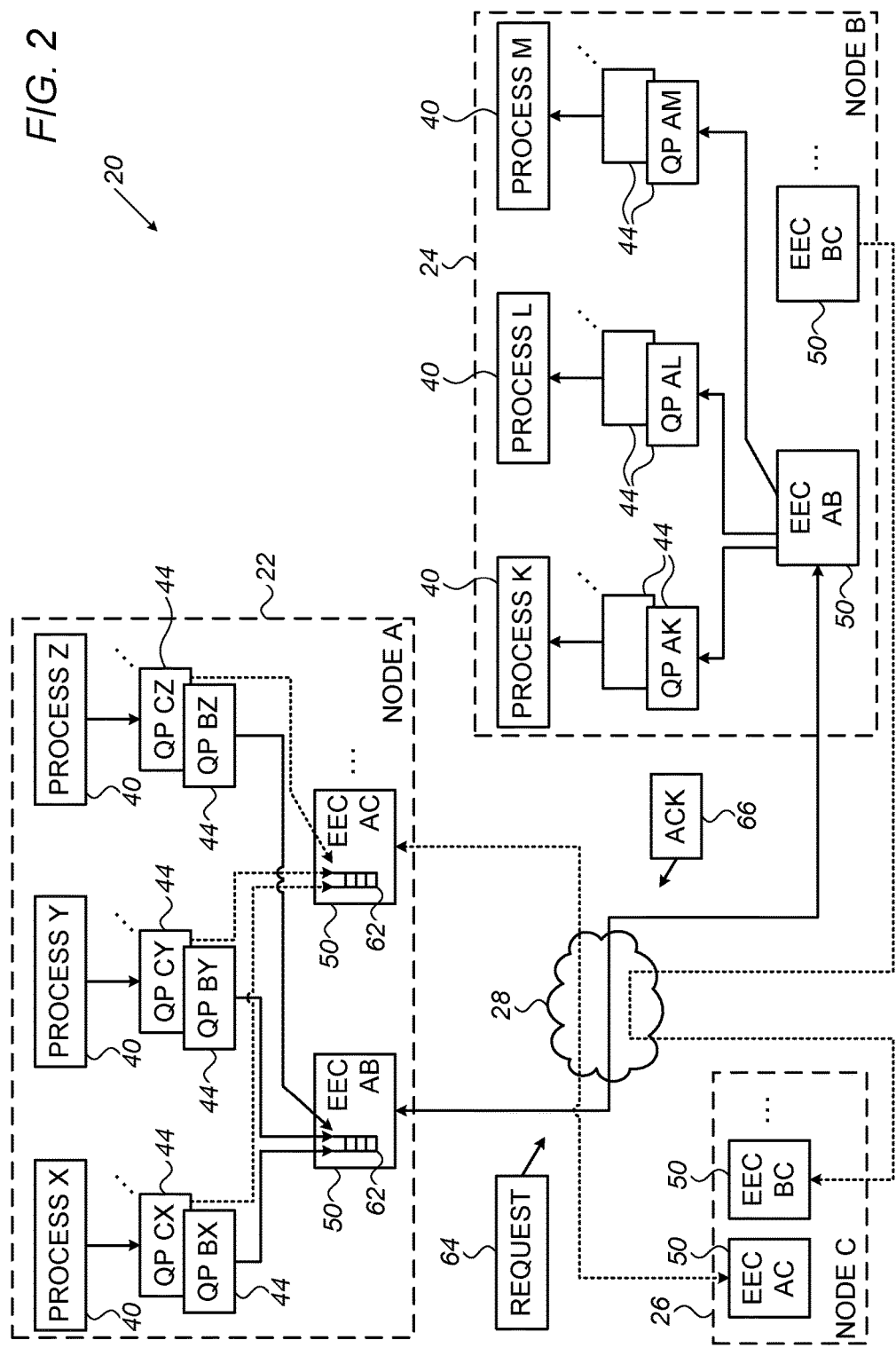
FIG. 2 is a block diagram that schematically illustrates data structures used in an enhanced reliable datagram service, in accordance with an embodiment of the invention.

FIG. 2 is a block diagram that schematically illustrates data structures used in an enhanced reliable datagram service in system 20, in accordance with an embodiment of the invention. NICs 34 are typically capable of supporting other transport services, as well, such as connected services and unreliable services, each with its respective context and set of QPs. For the sake of simplicity, however, FIG. 2 and the description that follows relate only to the sort of enhanced reliable datagram (ERD) service defined above.

Processes 40 running on node 22 (node A) are labeled processes X, Y, Z, ... , while those running on node 24 (node B) are labeled processes K, L, M, .... Each process 40 communicates with peer processes on other nodes and is accordingly assigned a respective ERD QP 44 for each peer process with which it is to communicate using the ERD service. Thus, for example, process X on node 22 has ERD QPs labeled QP BX, for communication with a process on node B (for example, process K), and QP CX, for communication with a process on node C. Processes Y and Z have similar allocations of QPs. As noted earlier, when process X submits a work request to send a message to its peer process on node B, a corresponding WQE is queued in the send queue of QP BX, to be executed by NIC 34.

Using EECs 50, NIC 34 of node A establishes an ERD channel with the peer NIC of each other node with which processes on node A are to communicate using the ERD service. Thus, for example, as shown in FIG. 2, a channel using EEC AB is established for ERD communication between processes on node A with processes on node B. Similarly, a channel using EEC AC carries ERD communications between node A and node C.

Each QP 44 feeds WQEs to the ERD channel corresponding to the destination node of the QP. Thus, in FIG. 2, QP BX, QP BY and QP BZ all feed EEC AB, for transmission to node B. EEC 50 has a queue 62, which arbitrates among WQEs from the different QPs 44 that are associated with the EEC. Queue 62 may be established and organized by software running on CPU 30, or it may be a virtual queue, created by arbitration among the participating QPs that is carried out in hardware by circuitry 58 in NIC 34, for example as a function of block 60. This arbitration may be carried out using any suitable sort of queuing scheme that is known in the art, such as a round robin among the participating QPs 44 that have WQEs awaiting execution. NIC 34 thus accepts WQEs by reading and executing the WQEs from memory 32 in the order of queue 62 and transmits them in sequence, using EEC 50, to the appropriate destination node.

As part of the execution of a WQE, NIC 34 transmits a request message, comprising one or more packets 64, over network 28 to node B. Packet 64 may comprise, for example, an RDMA write or read request or a send request, which is formatted according to the requirements of the ERD transport protocol. In an embodiment of the present invention, packet 64 has the following format:

| LRH | BTH | ERDETH | ERDEQH | Payload | CRC |

The local routing header (LRH), payload and cyclic redundancy code (CRC) fields (as well as certain optional, additional header fields not shown here) are standard parts of any IB packet, as defined by the IB specification. In the present embodiment, the other fields shown above have the following contents and meanings:

The base transport header (BTH) contains the number of the destination EEC (EEC AB on node B in the present example), rather than the destination QP number as in other sorts of transport services defined by the IB specification. The BTH also contains the packet serial number (PSN).

The ERD extended transport header (ERDETH) contains ancillary ERD-related information, including, for example, a resynchronization sequence number, used to identify the most recent packet-sequence transmitted on this EEC, as explained further hereinbelow. The ERDETH also contains a number identifying the source EEC, which can be used, for example, in returning congestion notification packets, referencing the source EEC, from other nodes in system 20 to node A when necessary.

The ERD extended queue header (ERDEQH) identifies the source QP number and the destination QP number, as well as a key (ERDQkey) that is used by NICs 34 to verify that the remote requester QP is eligible to access the local responder QP. The ERDEQH information is typically included in the first (or only) packet of each request message, and need not be included in acknowledgment packets.

Although the above set of fields and their contents are advantageous in efficient implementation of an enhanced reliable datagram transport service, they are listed here only by way of example. Alternative implementations of the principles of such a transport service will be apparent to those skilled in the art after reading the present description and are considered to be within the scope of the present invention.

Upon receiving packet 64, responder NIC 34 of node B reads the destination EEC number from the BTH, and thus identifies the packet as belonging to EEC AB. The responder NIC also reads the ERDEQH to identify the destination QP number and delivers the request accordingly to the receiving process 40. When packet 64 is an RDMA read request, the responder NIC assembles and transmits an RDMA read response packet, using EEC AB, to the requesting NIC.

Responder NIC 34 tracks the packet serial numbers in each EEC 50 and periodically transmits an acknowledgment packet 66 for this EEC to the requester NIC. An acknowledgment need not be sent after every request packet or message, but rather may be coalesced by the responder to acknowledge a sequence of packets with successive packet serial numbers that were received on this EEC by the responder NIC. As noted above, an RDMA read response may also serve as a coalesced acknowledgment. In any case, the acknowledgment packet contains only the most recently-received packet serial number in the sequence and thus implicitly acknowledges receipt of the packets with all preceding packet serial numbers.

In contrast to request packet 64, the ERDEQH of acknowledgment packet 66 does not identify the source and destination QPs. In other words, the acknowledgment references the end-to-end reliable transport context (EEC AB in the present example) but does not reference the QPs. Thus, the coalesced acknowledgment can typically confirm receipt of request packets transmitted on the same EEC from multiple different source QPs on the source node to multiple different destination QPs on the destination node.

Figure 3:
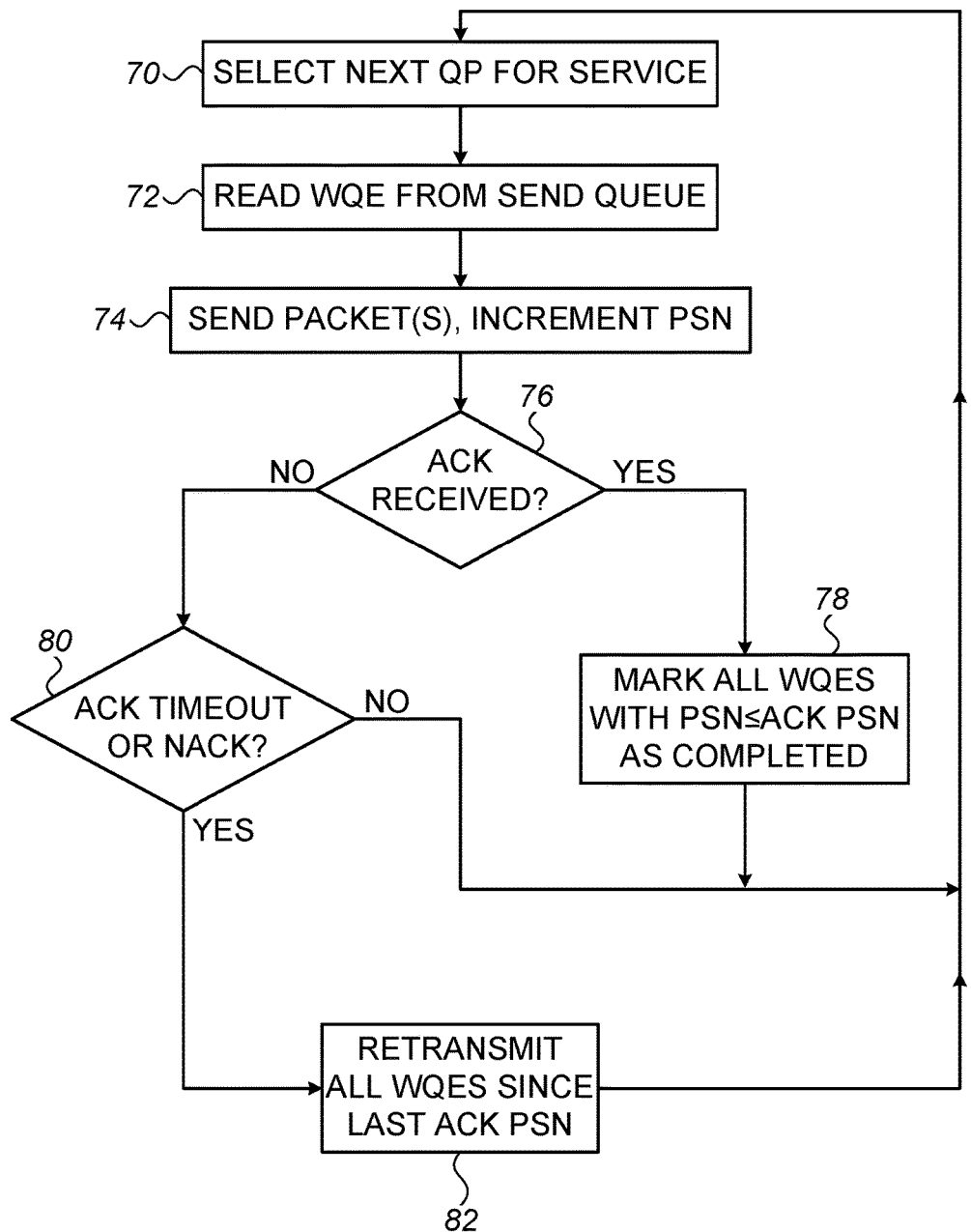
FIG. 3 is a flow chart that schematically illustrates a method for communication, in accordance with an embodiment of the invention.

FIG. 3 is a flow chart that schematically illustrates a method for communication over an ERD channel, in accordance with an embodiment of the invention. The method is described, for convenience and clarity, with reference to the elements of system 20 and the data structures that are shown and described above. The principles of this method, however, may similarly be applied in other network topologies and using other data structures of similar functionality. Although the method of FIG. 3 refers to handling by requester NIC 34 of a single EEC 50, in practice the requester NIC will typically handle multiple, different EECs concurrently, thus communicating with multiple different responder NICs. In addition, NIC 34 typically also serves as the responder NIC in handling requests transmitted from other NICs using these EECs.

To service queue 62 of EEC 50, NIC 34 selects the next participating QP 44 for service, at a QP selection step 70. This step typically involves arbitration by circuitry 58 among multiple QPs that have WQEs awaiting execution. NIC 34 reads the WQE from the selected send queue 46, at a WQE reading step 72. Based on this WQE, circuitry 58 assembles and transmits one or more request packets 64, at a WQE execution step 74. In the present embodiment, the packet headers have the format that is shown and described above, including the BTH, the ERDETH and, in the first or only packet of a given message, the ERDEQH referencing the EEC and the source and destination QPs. Circuitry 58 increments the packet serial number (PSN) of each successive packet transmitted on this EEC 50 and maintains a record of the transmitted messages. The record includes, for example, the PSN of at least the first (or only) packet in each message and the WQE used in creating each message or, alternatively or additionally, a copy of the message itself.

After transmission of a request packet or packets belonging to a request message or messages, NIC 34 checks whether an acknowledgment 66 has been received from the responder NIC on this EEC 50, at an acknowledgment checking step 76. If so, the acknowledgment will contain a certain PSN value and will implicitly acknowledge all request messages comprising packets sent with preceding PSN values. Thus, in response to the acknowledgment, circuitry 58 in NIC 34 refers to its record of transmitted messages and marks as completed all WQEs corresponding to these acknowledged request messages, at a WQE completion step 78. These completed WQEs may be removed from the record. NIC 34 notifies the sender processes that submitted the work requests corresponding to the completed WQEs that their requests have been fulfilled, for example by writing completion reports (known as completion queue elements) to an assigned completion queue. NIC 34 then goes on to select the next QP for service at step 70.

When no acknowledgment is received from the responder NIC at step 76, requester NIC 34 checks when the responder has sent a negative acknowledgment (NACK), or whether a predefined timeout has elapsed, at a packet loss checking step 80. As long as neither of these events has occurred, NIC 34 returns to step 70 and continues to transmit packets over this ERD channel while awaiting a coalesced acknowledgment.

In the event of known or suspected packet loss, due to a NACK or timeout at step 80, requesting NIC 34 retransmits the packets that were evidently lost, at a retransmission step 82. At this step, circuitry 58 consults the record of transmitted request messages, and on this basis retransmits all packets (or equivalently, re-executes all WQEs) that were transmitted using this EEC 50 subsequently to the last request packet that was acknowledged by the responder NIC on this EEC. As explained earlier, this retransmission can typically include packets with multiple different source and destination QPs, or in other words, different sender and receiver processes. Once the retransmission is completed, NIC 34 returns to select the next QP for service at step 70, and normal packet transmission resumes.

NIC 34 is also capable of handling non-transport errors, i.e., errors related to the QPs that are exchanging messages on the ERD connection, such as memory access violations, remote operation errors, and ERDkey violations, for example. To ensure EEC resiliency and resume operations reliably on behalf of other QPs when retransmission is necessitated by a non-transport error, NIC 34 uses the resynchronization sequence number mentioned above to avoid duplication of message deliveries and corruption of data on the ERD connection. To enable the responder NIC to recognize and discard copies of packets that it has already received, the requesting NIC in this case increments the resynchronization sequence number in the ERDETH, thus hinting the responder that a new sequence is now taking place and old sequence packets are invalid and should be discarded.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   establishing, using an end-to-end reliable transport context, a channel for exchange of data packets over a network between a first network interface controller (NIC) of a first computing node on the network and a second NIC of a second computing node on the network;
   accepting in the first NIC first and second work items for execution on behalf of different, first and second sender processes, respectively, that are running on the first computing node;
   executing the first work item by transmitting over the network from the first NIC to the second NIC, using the end-to-end reliable transport context, a first message comprising at least one first packet directed to a first receiver process running on the second computing node;
   executing the second work item by transmitting over the network from the first NIC to the second NIC, using the same end-to-end reliable transport context and before receiving from the second NIC any acknowledgment of the first message, a second message comprising at least one second packet directed to a second receiver process running on the second computing node, different from the first receiver process;
   receiving at the first NIC from the second NIC an acknowledgment referring to the at least one second packet; and
   reporting, in response to the acknowledgment, from the first NIC to both the first and second sender processes that the first and second work items have been completed.

2. The method according to claim 1, wherein transmitting the first and second messages comprises attaching, in the first NIC, at least first and second packet serial numbers, respectively, to the at least one first packet and the at least one second packet while maintaining a record in the first NIC of the packet serial numbers,
   wherein the acknowledgment refers only to the second packet serial number, and the first NIC refers to the record in reporting to the first sender process that the first work item has been completed.

3. The method according to claim 1, wherein accepting the first and second work items comprises reading the first and second work items from first and second work queues, respectively, wherein the at least one first packet and the at least one second packet respectively reference the first and second work queues, as well as the end-to-end reliable transport context, and
   wherein the acknowledgment references the end-to-end reliable transport context but does not reference the first or the second work queue.

4. The method according to claim 1, wherein the at least one second message comprises a read request directed to the second receiver process, and wherein the acknowledgment comprises a read response conveying data from a memory of the second computing node to the first computing node.

5. The method according to claim 1, and comprising:
   maintaining a record in the first NIC of the transmitted messages; and
   when no acknowledgment is received from the second NIC to either of the first and second messages, retransmitting, responsively to the record, both the first and the second messages from the first NIC to the second NIC.

6. The method according to claim 5, wherein retransmitting both the first and the second messages comprises retransmitting all of the packets that were transmitted by the first NIC using the end-to-end reliable transport context subsequently to a last packet that was transmitted by the first NIC and acknowledged by the second NIC using the same end-to-end reliable transport context.

7. The method according to claim 1, wherein establishing the channel comprises establishing multiple channels using respective end-to-end reliable transport contexts between the first NIC and respective NICs of multiple other computing nodes on the network, wherein each of the end-to-end reliable transport contexts is configured to serve multiple sender and receiver processes running on the first computing node and the other computing nodes.

8. The method according to claim 1, wherein transmitting the first message comprises incorporating a source end-to-end context (EEC) identifier in the at least one first packet, wherein the method further comprises returning a congestion notification from another node on the network to the first NIC referencing the EEC identifier.

9. The method according to claim 1, wherein transmitting the first message comprises incorporating a resynchronization sequence number in the at least one first packet, wherein the method further comprises:
maintaining a record in the first NIC of the transmitted messages and the resynchronization sequence number; and
when an error occurs in one or more of the messages transmitted to the second NIC, retransmitting, responsively to the record, the one or more of the messages from the first NIC to the second NIC while incrementing the resynchronization sequence number in the one or more retransmitted messages.

10. A communication apparatus, comprising:
a host interface, which is configured to communicate, with a host bus, with a central processing unit (CPU) of a first computing node running different, first and second sender processes;
a network interface, which is configured to exchange data packets over a network with a peer network interface controller (NIC) of a second computing node; and
processing circuitry, coupled between the host interface and the network interface and configured to establish, using an end-to-end reliable transport context, a channel for communication over the network with the peer NIC, to accept, via the host interface, first and second work items for execution on behalf of the first and second sender processes, respectively, to transmit to the peer NIC through the network interface, in execution of the first work item, using the end-to-end reliable transport context, a first message comprising at least one first packet directed to a first receiver process running on the second computing node, and to transmit to the peer NIC through the network interface, in execution of the second work item, using the same end-to-end reliable transport context and before receiving from the peer NIC any acknowledgment of the first message, a second message comprising at least one second packet directed to a second receiver process running on the second computing node, different from the first receiver process,
wherein the processing circuitry is configured to receive from the second NIC, via the network interface, an acknowledgment referring to the at least one second packet, and to report, in response to the acknowledgment, to both the first and second sender processes that the first and second work items have been completed.

11. The apparatus according to claim 10, wherein the processing circuitry is configured to attach at least first and second packet serial numbers, respectively, to the at least one first packet and the at least one second packet while maintaining a record of the packet serial numbers,
wherein the acknowledgment refers only to the second packet serial number, and the processing circuitry refers to the record in reporting to the first sender process that the first work item has been completed.

12. The apparatus according to claim 10, wherein the processing circuitry is configured to read the first and second work items from first and second work queues, respectively, wherein the at least one first packet and the at least one second packet respectively reference the first and second work queues, as well as the end-to-end reliable transport context, and
wherein the acknowledgment references the end-to-end reliable transport context but does not reference the first or the second work queue.

13. The apparatus according to claim 10, wherein the at least one second packet comprises a read request directed to the second receiver process, and wherein the acknowledgment comprises a read response conveying data from a memory of the second computing node to the first computing node.

14. The apparatus according to claim 10, wherein the processing circuitry is configured to maintain a record of the transmitted messages, and when no acknowledgment is received from the peer NIC to either of the first and second messages, to retransmit, responsively to the record, both the first and the second messages via the network interface to the peer NIC.

15. The apparatus according to claim 14, wherein the processing circuitry is configured, when no acknowledgment is received from the peer NIC to the second message, to retransmit all of the packets that were transmitted to the peer NIC using the end-to-end reliable transport context subsequently to a last packet that was transmitted to and acknowledged by the peer NIC using the same end-to-end reliable transport context.

16. The apparatus according to claim 10, wherein the processing circuitry is configured to establish multiple channels using respective end-to-end reliable transport contexts between the first computing node and respective peer NICs of multiple other computing nodes on the network, wherein each of the end-to-end reliable transport contexts is configured to serve multiple sender and receiver processes running on the first computing node and the other computing nodes.

17. The apparatus according to claim 10, wherein the processing circuitry is configured to incorporate a source end-to-end context (EEC) identifier in the at least one first packet, and to receive a congestion notification from another node on the network referencing the EEC identifier.

18. The apparatus according to claim 10, wherein the processing circuitry is configured to incorporate a resynchronization sequence number in the at least one first packet, while maintaining a record of the transmitted messages and the resynchronization sequence number, and when an error occurs in one or more of the messages transmitted to the peer NIC, to retransmit, responsively to the record, the one or more of the messages to the peer NIC while incrementing the resynchronization sequence number in the one or more retransmitted messages.

* * * * *